Jan. 22, 1963 S. KRIZMAN 3,074,736
BALL JOINT ASSEMBLY FOR WHEEL SUSPENSION
Filed Dec. 19, 1960 2 Sheets-Sheet 1

INVENTOR.
STEVE KRIZMAN
BY *M. A. Hobbs*
ATTORNEY 3,074,736
BALL JOINT ASSEMBLY FOR WHEEL SUSPENSION
Steve Krizman, % Krizman Mfg. Co. Inc., 2110 S. Lafayette Blvd., South Bend, Ind.
Filed Dec. 19, 1960, Ser. No. 76,629
7 Claims. (Cl. 280—96.1)

The present invention relates to a wheel suspension mechanism, and more particularly to a ball joint forming a part of the conventional front wheel suspension of an automobile.

Most present day automobiles are equipped with an independent front wheel suspension having an upper and lower suspension or control arm, and a ball joint connected to the upper suspension arm for supporting the spindle and connecting supporting member. The upper suspension arm is of an A shape construction with the base firmly pivoted on the vehicle frame and the apex of the arm projecting outwardly toward the wheel and supporting the ball joint unit which is riveted or otherwise rigidly and permanently joined to the arm. As the vehicle is used, wear gradually occurs in the ball joint, such that in time it is necessary to replace the ball joint alone, or along with the upper suspension arm. This operation is not only relatively expensive and time consuming, but the newly installed ball joint wears in the same manner and likewise must eventually be replaced, in that the conventional or standard joint is nonadjustable and hence can not be tightened to compensate for the wear. Further, once wear has begun it progresses rapidly, since dirt, grit and other abrasive foreign matter readily find their way into the joint. It is therefore one of the principal objects of the present invention to provide a ball joint device for the upper control arm of the foregoing type of independent front wheel suspension, which can be easily installed in place of the original joint without removing the arm and which can thereafter be readily adjusted to compensate for all normal wear occurring through use of the vehicle.

Another object of the invention is to provide a ball joint of the aforesaid type which can be mounted in place on the upper suspension arm using the seat and holes initially provided in the arm for the original ball joint and which, when fully installed, provides easily accessible means for obtaining and maintaining proper adjustment.

Still another object of the invention is to provide a relatively simple, easily fabricated and assembled ball joint for use on an independent front wheel suspension for automobiles, which can easily and effectively be lubricated while mounted in operating position in the suspension, and which can be readily repaired and the worn parts replaced during the normal life of the vehicle without disassembling the wheel suspension.

Further objects and advantages of the present invention will become apparent from the following description and accompanying drawings, wherein.

Figure 1:
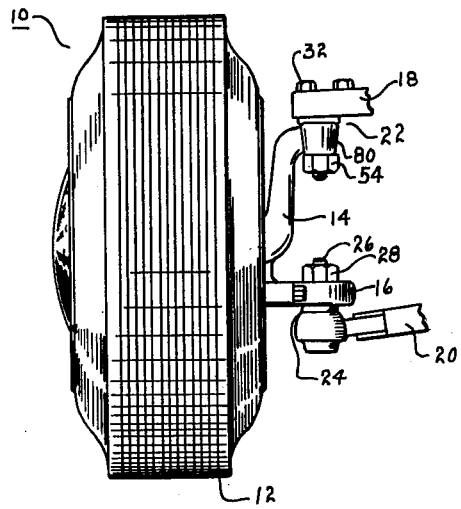
FIGURE 1 is a front elevational view of an automobile wheel assembly showing the tire, a portion of the spindle support, and the upper and lower arms of the independent wheel suspension mechanism, embodying the present invention.
Figure 5:
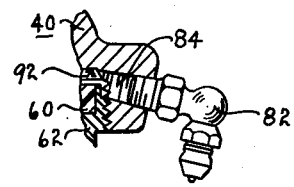
FIGURE 5 is a fragmentary vertical cross sectional view of the present ball joint device, taken on line 5—5 of FIGURE 3, showing a lubricating fixture in elevation attached thereto.
Figure 4:
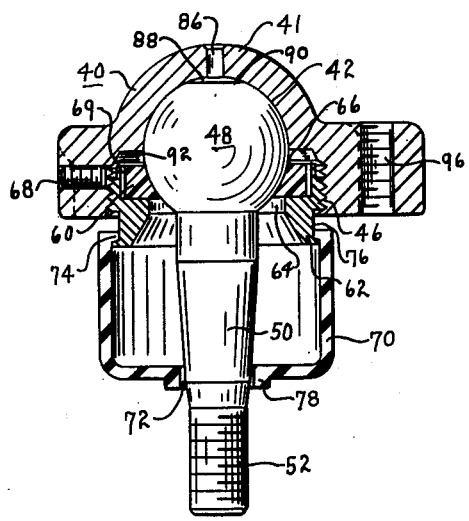
FIGURE 4 is a vertical cross sectional view through the ball joint device shown in the preceding figures, taken on line 4—4 of FIGURE 3.
Figure 3:
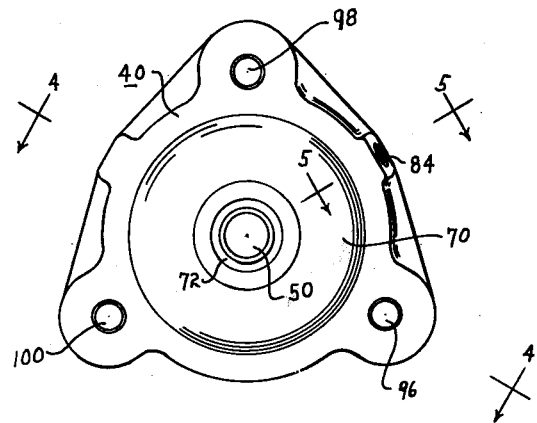
FIGURE 3 is a bottom elevational view of the ball joint device.
Figure 2:
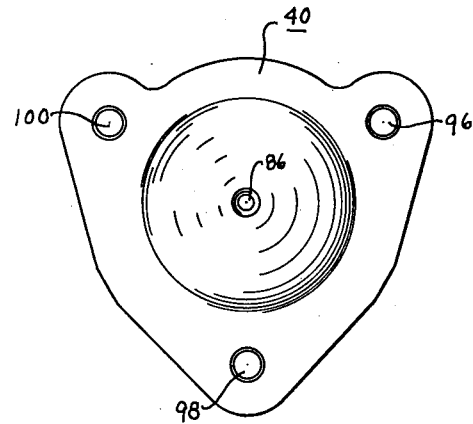
FIGURE 2 is a top plan view of the present ball joint device.

Referring more specifically to the drawings, the front wheel and suspension assembly embodying the present ball joint device is designated by numeral 10 and includes a tire 12 mounted on a spindle, the support members of which are shown at numerals 14 and 16 connected to upper suspension arm 18 and lower suspension arm 20, respectively, and attached to the respective arms by ball joint 22 embodying the present invention, and joint 24 of any suitable construction. Joint 24 is secured to member 16 by a stud 26 having a nut 28 threadedly received thereon. The independent front wheel suspension shown in the drawings, consisting of the spindle, its supporting members, and upper and lower arms 18 and 20, for the purpose of the present description, is considered as standard or conventional, and forms no direct part of the present invention. The type shown is used extensively on late model cars, and consequently, the details of the suspension will not be described herein.

The present ball joint is secured to the under side of upper suspension arm 18 by a plurality of bolts 32, and consists of a cast metal body 40 having a dome shaped portion 41 with a hemispherically shaped chamber 42 opening on the lower side through a threaded bore 46. The inner surface of portion 41 is smooth and forms the bearing for a ball 48 which is adapted to rotate through 360 degrees and to swing at a substantial angle in all directions. Joined to the lower portion of ball 48 is a stud 50 extending downwardly through bore 46 and having a threaded portion 52 at its lower end for receiving nut 54 for retaining the eye of spindle member 14 in place on stud 50, in the position shown in FIGURE 1.

Ball 48 is held firmly seated in chamber or socket 42 by a nylon bushing 60 adjustably supported in the lower portion of body 40 by a retainer ring 62 threadedly received in threaded bore 46. Retainer ring 62 and bushing 60 are provided with center holes 64 and 66, respectively, for receiving stem 50 and ball 48, the surface defining hole 66 being of a curvature conforming to the curvature of ball 48. Retainer ring 62 can be adjusted upwardly or downwardly to obtain the desired fit of ball 48 in socket 42, and as wear occurs in socket 42 during the life of the vehicle, bushing 60 is moved upwardly by the rotation of retainer ring 62 so that the ball seats on the inner surface of portion 41 and is held sufficiently tight to prevent wobbling or jostling of the spindle and wheel. Once an adjustment has been made, retainer ring 62 is secured in place by a set screw 68 extending inwardly through the side wall of body 40 and seating against the external surface of the retainer ring. Bushing 60 fits loosely within an annular recess 69 on the upper side of retaining ring 62 so that it can adjust to slightly out of round configuration developing in ball 48 as wear occurs.

In order to seal the bearing surfaces of the ball joint from dirt, grit and other foreign matter, a cup shaped rubber shield 70 having a centrally located hole 72 in the bottom thereof, is slipped upwardly onto stud 50 and is secured in place on the stud in sealing relationship with retainer ring 62 by an inwardly extending flange 74 seating in an annular groove 76 in the external surface of the retainer ring. The cup shaped shield snaps into groove 76 and forms a fluid tight seal with the ring. A flange 78 encircling hole 72 seats against stud 50 when the cup is pressed upwardly and partially collapsed by the installation of the eye portion 80 of member 14 when the ball joint device is assembled within the suspension mechanism.

Socket 42 and ball 48 are effectively lubricated by a lubricant fixture 82 threadedly received in a bore 84 in the side of body 40, and through an oil lubricant port 86 extending downwardly through the upper side of portion 41 and communicating with a small area 88 formed by the flat end 90 of ball 48. The lubricant injected through fixture 82 enters annular groove 92 and flows inwardly and downwardly around the ball along surface 66 of bushing 60, and the lubricant entering port 86 flows through area 88 downwardly between the ball and the inner surface of dome shaped portion 41 to effectively lubricate the entire upper surface of the ball.

When the present ball joint is to be installed in a wheel suspension mechanism, the original ball joint, which is normally secured by rivets, is removed from upper suspension arm 18 by severing the rivets, removing the original unit, and seating the present unit on the under side of the arm. Bolts 32 are then placed downwardly through the original rivet holes of arm 18 and threadedly received in holes 96, 98 and 100 in the body. Ball 48 is then placed in chamber 42 with bushing 60 seated on the under side thereof, and retainer ring 62 threadedly secured to the under side of the body by screwing it upwardly into bore 46. After the proper clearance is obtained for the ball in chamber 42 by tightening ring 62, set screw 68 is tightened to hold the ring in its adjusted position. Cup shaped shield 70 is then slipped onto stud 50 and flange 74 is seated in recess 76, which retains the cup on the stud until eye portion 80 of spindle support 14 is slipped onto the stud and secured thereon by nut 54. The ball joint is then lubricated by introducing lubricant through fixture 82 and port 86 in the manner previously described.

In the construction of the present ball joint device, various materials may be used. However, it is preferred that the body 40 be formed of cast malleable iron, bushing 60 of nylon or other suitable bearing material, retainer ring 62 of steel or aluminum, ball 48 and stud 50 of forged steel, and cup 70 of rubber, neoprene, or similar material. The present invention is not restricted to any particular material or materials.

While only one embodiment of the present invention has been described in detail herein, various changes and modifications may be made without departing from the scope of the invention.

I claim:

1. In a front wheel suspension mechanism for an automobile having an upper suspension arm and a spindle with a support member having an eye at one end, a ball joint comprising a body of cast metal, a flange on said body having a plurality of holes therein for bolts for connecting said body to the arm, said body having a downwardly facing substantially hemispherically shaped chamber with a downwardly extending threaded opening, a metal ball seated in said chamber, a downwardly extending stem integrally connected to said ball and passing through said opening for receiving said eye, a nut threadedly received on the end opposite said ball for retaining said eye on said stem, an annular nylon bushing seated in said opening against said ball and having the inner surface thereof curved to conform to the curvature of said ball, a retainer ring threadedly received in said opening and having a shoulder for engaging said bushing and an outwardly facing annular groove on the lower peripheral surface, and a flexible cup shaped member having a central hole around said stem and a flange for seating in said groove, said body having upper and lower lubricant ports communicating with said chamber.

2. In a front wheel suspension mechanism for an automobile having an upper suspension arm and a spindle with a support member having an eye at one end, a ball joint comprising a body, a means for connecting said body to the arm, said body having a substantially hemispherically shaped chamber with a threaded opening on one side, a ball seated in said chamber, a stem integrally connected to said ball and extending through said opening for receiving said eye, a nut threadedly received on the end opposite said ball for retaining said eye on said stem, an annular nylon bushing seated in said opening against said ball and having the inner surface thereof curved to conform to the curvature of said ball, a retainer ring threadedly received in said opening and having a shoulder for engaging said bushing and an outwardly facing annular groove on the lower peripheral surface, and a flexible cup shaped member having a central hole around said stem and a flange for seating in said groove.

3. In a front wheel suspension mechanism for an automobile having an upper suspension arm and a spindle with a support member having an eye at one end, a ball joint comprising a body, a means for connecting said body to the arm, said body having a substantially hemispherically shaped chamber with a threaded opening on one side, a metal ball seated in said chamber, a stem integrally connected to said ball and extending through said opening for receiving said eye, a nut threadedly received on the end opposite said ball for retaining said eye on said stem, an annular bushing of a diameter smaller than the threaded portion of said opening seated in said opening against said ball and having the inner surface thereof curved to conform to the curvature of said ball, and a retainer ring threadedly received in said opening and having a shoulder forming an abutment for engaging said bushing, said retainer being spaced radially from said bushing to permit said bushing to adjust itself laterally with respect to the portion of the stem passing through said bushing.

4. In a front wheel suspension mechanism for an automobile having an upper suspension arm and a spindle with a support member having an eye at one end, a ball joint comprising a body, a means for connecting said body to the arm, said body having a substantially hemispherically shaped chamber with a threaded opening on one side, a metal ball seated in said chamber, a stem integrally connected to said ball and extending through said opening for receiving said eye, a nut threadedly received on the end opposite said ball for retaining said eye on said stem, an annular bushing of a diameter smaller than the threaded portion of said opening seated in said opening against said ball and having the inner surface thereof curved to conform to the curvature of said ball, and a retainer ring threadedly received in said opening and having a shoulder forming an abutment for engaging said bushing, said retainer being spaced radially from said bushing to permit said bushing to adjust itself laterally with respect to the portion of the stem passing through said bushing.

5. In a front wheel suspension mechanism for an automobile having an upper suspension arm and a spindle with a support member having an eye at one end, a ball joint comprising a body, a means for connecting said body to the arm, said body having a substantially hemispherically shaped chamber with a threaded opening on one side, a ball seated in said chamber, a stem connected to said ball and extending through said opening for receiving said eye, an annular bushing of a diameter smaller than the threaded portion of said opening seated in said opening against said ball, and a retainer ring threadedly received in said opening and having a portion forming an abutment for engaging said bushing, said retainer being spaced radially from said bushing to permit said bushing to adjust itself laterally with respect to the portion of the stem passing through said bushing.

6. A ball joint comprising a body having a substantially hemispherically shaped chamber with a threaded opening on one side, a ball seated in said chamber, a stem integrally connected to said ball and extending through said opening, an annular nylon bushing seated in said opening against said ball and having the inner surface thereof curved to conform to the curvature of said ball, a retainer ring threadedly received in said opening and having a shoulder for engaging said bushing and an outwardly facing annular groove on the lower peripheral surface, and a flexible cup shaped member having a central hole around said stem and a flange for seating in said groove.

7. A ball joint comprising a body having a substantially hemispherically shaped chamber with a threaded opening on one side, a ball seated in said chamber, a stem connected to said ball and extending through said opening, an annular bushing of a diameter smaller than the threaded portion of said opening seated in said opening against said ball, and a retainer ring threadedly received in said opening and having a portion forming an abutment for engaging said bushing, said retainer being spaced radially from said bushing to permit said bushing to adjust itself laterally with respect to the portion of the stem passing through said bushing.

References Cited in the file of this patent
UNITED STATES PATENTS

| | | |
|---|---|---|
| 2,593,253 | Booth | Apr. 15, 1952 |
| 2,631,044 | Booth | Mar. 10, 1953 |
| 2,880,025 | Herbenar et al. | Mar. 31, 1959 |
| 2,913,268 | Booth | Nov. 17, 1959 |
| 2,932,534 | Williams | Apr. 12, 1960 |
| 2,954,993 | Scheublein | Oct. 4, 1960 |

OTHER REFERENCES

German application E10,373II/63c, July 26, 1956.